US012752548B2

(12) United States Patent
Richard

(10) Patent No.: US 12,752,548 B2
(45) Date of Patent: Oct. 6, 2026

(54) METHOD FOR FINE ADJUSTMENT OF THE POSITION OF INK DROPS PRINTED BY AT LEAST ONE PRINTING HEAD OF A PRINTING DEVICE AND PRINTING DEVICE

(71) Applicant: BOBST MEX SA, Mex (CH)

(72) Inventor: Matthieu Richard, Remoray (FR)

(73) Assignee: BOBST MEX SA, Mex (CH)

( * ) Notice: Subject to any disclaimer, the term of this patent is extended or adjusted under 35 U.S.C. 154(b) by 132 days.

(21) Appl. No.: 18/338,728

(22) Filed: Jun. 21, 2023

(65) Prior Publication Data

US 2023/0415492 A1 Dec. 28, 2023

(30) Foreign Application Priority Data

Jun. 22, 2022 (EP) .................................... 22180525

(51) Int. Cl.

| | |
|---|---|
| ***B41J 29/393*** | (2006.01) |
| ***B41J 2/14*** | (2006.01) |
| ***B41J 2/215*** | (2006.01) |

(52) U.S. Cl.

CPC *B41J 2/215* (2013.01); *B41J 2/14* (2013.01)

(58) Field of Classification Search

CPC ..... B41J 2/04573; B41J 29/393; B41J 2/2135

See application file for complete search history.

(56) References Cited

U.S. PATENT DOCUMENTS

| | | | | |
|---|---|---|---|---|
| 6,464,331 | B1 | 10/2002 | Van Doorn et al. | |
| 2003/0090534 | A1 | 5/2003 | Valero et al. | |
| 2005/0083364 | A1* | 4/2005 | Billow | B41J 19/145 347/19 |
| 2006/0012624 | A1* | 1/2006 | Vanhooydonck | B41J 2/2054 347/15 |

(Continued)

FOREIGN PATENT DOCUMENTS

| | | | |
|---|---|---|---|
| CN | 102712194 | A | 10/2012 |
| CN | 106004040 | A | 10/2016 |
| CN | 106457822 | A | 2/2017 |

(Continued)

*Primary Examiner* — Jason S Uhlenhake

(74) *Attorney, Agent, or Firm* — Bookoff McAndrews, PLLC

(57) ABSTRACT

A method for fine adjustment of the position of ink drops printed by at least one printing head (12) of a printing device, the printing head (12) being a two-dimensional printing head (12) comprising a plurality of nozzles (30). In one method step, an ink drop is dispensed at a plurality of nozzles (30) of the at least one printing head (12) simultaneously to print an image, preferably at all nozzles (30) of the printing head (12). In another method step, the printed image is captured by a camera (20), wherein the camera (20) captures the pattern of dots printed by the printing head (12) and the captured pattern is compared to a pattern (36) of the nozzles (30) of the printing head (12). In a further method step, the dispensation of an ink drop from at least one nozzle (30) is modified in terms of timing with respect to the dispense of ink drops from the other nozzles (30) of the (Continued)

Figure 1:
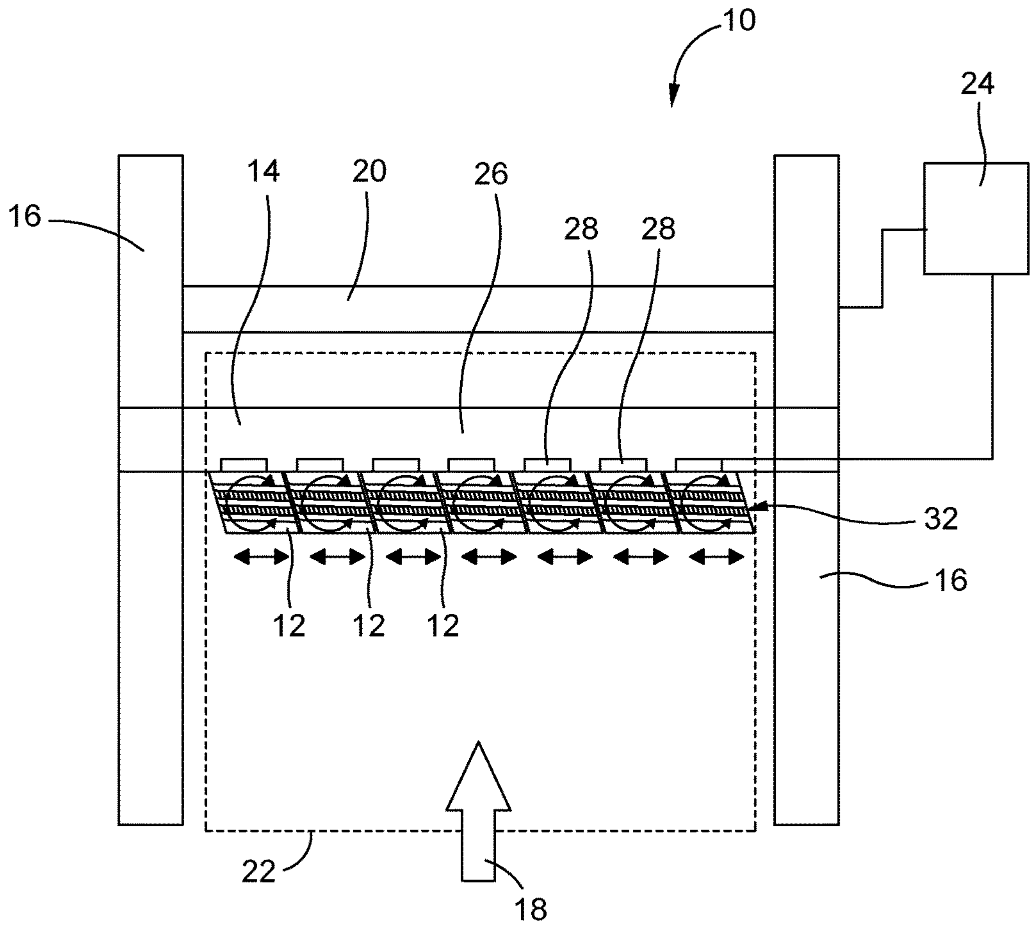

printing head (12) for the subsequent printing process if a deviation has been detected between the pattern (36) of dots printed by the printing head (12) and the nozzle pattern (36). Furthermore, a printing device is provided.

15 Claims, 3 Drawing Sheets

(56) References Cited

U.S. PATENT DOCUMENTS

2009/0267977 A1* 10/2009 Sumi ...................... B41J 25/001
347/9

FOREIGN PATENT DOCUMENTS

| | | | |
|---|---|---|---|
| CN | 106881965 | A | 6/2017 |
| CN | 110267819 | A | 9/2019 |
| CN | 114536975 | A | 5/2022 |
| CN | 117261459 | A | 12/2023 |
| EP | 2105309 | B1 | 9/2009 |
| WO | 2007039444 | A1 | 4/2007 |

* cited by examiner

METHOD FOR FINE ADJUSTMENT OF THE POSITION OF INK DROPS PRINTED BY AT LEAST ONE PRINTING HEAD OF A PRINTING DEVICE AND PRINTING DEVICE

CROSS-REFERENCE TO RELATED APPLICATION(S)

This patent application claims the benefit of priority to European Application No. 22180525.2, filed on Jun. 22, 2022, the entirety of which is incorporated herein by reference.

The present invention refers to a method for a fine adjustment of the position of ink drops printed by at least one printing head of a printing device and a printing device comprising at least one printing heads.

Printing devices usually have several printing heads, each printing head comprising a plurality of nozzles for dispensing ink drops, wherein each ink drop forms an individual dot of a printed image. In an ideal case, when every nozzle of a printing head dispenses an ink drop simultaneously, the pattern of printed dots corresponds to the nozzle pattern of a printing head.

However, due to different random or uncontrolled factors, like small differences in reaction time of each individual nozzle, differences in ejection pressure and speed or differences in the angle of ejection of the ink drops, the pattern of printed dots differs from the nozzle pattern. This affects the quality of the printed image.

It is thus an object of the invention to provide a method for compensating the adverse effects as well as a respective printing device.

This object is solved by a method for fine adjustment of the position of ink drops printed by at least one printing head of a printing device, the printing head being a two-dimensional printing head comprising a plurality of nozzles. In one step of the method, an ink drop is dispensed at a plurality of nozzles of every printing head simultaneously to print an image, preferably at all nozzles of every printing head. The printed image is captured by a camera (or several combined cameras), wherein the camera captures the pattern of dots printed by the printing head and the captured pattern is compared to a pattern of the nozzles of the printing head. The dispensation of an ink drop from at least one nozzle is modified in terms of timing with respect to the dispense of ink drops from the other nozzles of the printing head for the subsequent printing process if a deviation is detected between the pattern of dots printed by the printing head and the nozzle pattern. In other words, the dispense of ink drops at single nozzles is controlled with a delay parameter to compensate for variations in the dispense timing of different nozzles of a printing head.

By dispensing ink drops at a plurality of nozzles simultaneously, the geometric pattern of the chosen nozzles is reproduced on the paper/support. Thus, by measuring the position of each ink drop individually, and by assuming that the relative position of each ink drop corresponds to the relative position of the chosen nozzles on the printing head, we can compute the (global) position of the printing head. Conversely, by assuming a target position of the printing head, we can compute a target position for each ink drop, i.e. each printed dot.

For determining a deviation of the position of the printed dots it is made use of the fact that the position of the nozzles within a printing head is known with a high precision. For example, the image printed by the printing head for means of fine adjustment consists of a plurality of dots, wherein each dot corresponds to one of the nozzles of the printing head, i.e. each nozzle prints one dot.

Thus, by modifying the dispensation of an ink drop from at least one nozzle in terms of timing, the ink drops are positioned with a higher accuracy, which positively affects the printing quality of a printed image.

A major advantage of the inventive method is, that the fine adjustment of the position of the dots may occur without any mechanical means just by controlling the dispensation timing with a respective software.

In particular, the adjustment occurs in an automated manner.

The method may comprise several iterations to ensure that the printing position of the dots is adjusted with the best possible accuracy.

According to one aspect, the position and/or orientation of the at least one printing head is determined based on the image captured by the camera and the deviation of the position and/or orientation of the printing head from a target position and/or orientation is determined and the position and/or the orientation of the printing head is adjusted based on the determined deviation. Thereby, the adjustment of the printing head may occur in a simple and precise manner.

Let's define the horizontal direction as the direction transverse to the advance direction of the printing device, and the vertical direction as the direction parallel to the advance direction of the printing device. When referring to the width, we refer to a length measured along the horizontal direction.

For example, the camera has a pixel size of less than half of the distance of two adjacent nozzles. Thereby, it is ensured that the camera may capture and distinguish every dot printed by the printing head. Consequently, the position of the dots and the position and/or orientation of each of the printing heads is determined in a very accurate manner, which allows an equally accurate fine adjustment of the dot position as well as an accurate adjustment of the position and/or orientation of the printing heads. In particular, the printing heads adjustment can occur accurately enough such that no transition zone is visible on the print between a printing head and its neighbouring printing head.

The pixel size of the camera is defined as the width of the camera's field of view measured on the substrate divided by the number of pixels along a line of the captured image by assuming, for the sake of the definition, that the line of the captured image is aligned with the horizontal direction. For example, if the field of view measured on the substrate is 10 cm wide, i.e., the image captures a ten cm wide area of the substrate, and the image captured by the camera is 1000 pixel wide, the pixel size is 10/1000 cm.

Please note that the distance between two adjacent nozzles is much larger than the distance between two adjacent printed pixels in an image, thanks to the print head geometry and accurate ink dispensing timing. By distance between two adjacent printed pixels we mean the horizontal distance between two columns of an image printed at the highest print resolution. We may also refer to this distance as the print resolution distance.

Instead of printing a dot at every nozzle, it is also possible that only a predetermined group of nozzles is addressed for the alignment process. For example every 2, every 3, every 5 or every 10 nozzles.

The camera in particular captures the dots printed by the printing head separately. That means that the camera, due to the specific pixel size, can distinguish all the dots printed by a printing head.

A further advantage is that a camera having the specific pixel size produces less data than a camera whose pixel size would be small enough to produce an image that exceeds the print resolution, i.e., an image with a huge number of pixels to cover the needed area. Thus, the camera having the specific pixel size reduces the overall cost and processing time.

The pixel size in the sense of the application means the size of an area of the printed image that is projected on an individual pixel of a camera sensor.

For example, the camera has a sensor with pixels in the size of 5 μm. By means of a suitable optic, a square of for example 90 μm width is projected on a pixel of the camera.

According to one aspect, the position of the at least one printing head is adjusted mechanically in a direction traverse to an advance direction of the printing device. The advance direction corresponds to a paper/substrate travel direction. The adjustment thus occurs in a simple manner.

Preferably, the rotational position of the at least one printing head is also adjusted mechanically.

The printing device may comprise at least two printing heads and a delay parameter may be determined for at least one printing head in order to compensate for a misalignment of the printing head along an advance direction of the printing device. Thereby, an adjustment in an advance direction of the printing device may be achieved by control means in a non-mechanical manner and the position of the printing head in advance direction can be rigidly fixed, in particular, such that the printing head is in principle immovable in advance direction. In other words, a mechanical adjustment in the advance direction can be omitted.

The camera preferably covers the whole width of the at least one printing head. In case of more than one printing head, the camera may cover the whole width of all printing heads. Thereby, the camera can capture the images printed by the at least one printing head respectively by all printing heads of a row of printing heads. This also contributes to a precise alignment of the printing heads. A camera that covers the whole width of the printing heads does not need to run back and forth to capture all images printed by the printing heads. Thus, the measurement accuracy is particularly high and the position of the printing heads with respect to each other can be determined in a precise manner. Also, the time to process the alignment is shortened compared to a moving camera, since every image captured by the camera records information about the alignment of every printing head simultaneously.

The object is further solved by a printing device, in particular an ink jet printing device, comprising at least one printing head, the printing head is a two-dimensional printing head comprising a plurality of nozzles, a camera being configured to capture an image printed by the printing heads, and a control unit configured for processing the image captured by the camera and for comparing a pattern of printed dots to a pattern of the nozzles of the printing head and detecting a deviation between the pattern of dots printed by the printing head and the nozzle pattern, wherein the control unit is configured for controlling a timing of a dispensation of ink drops from every nozzle of the at least one printing head individually if a deviation has been detected between the pattern of dots printed by the printing head and the nozzle pattern.

As already explained with respect to the inventive method, the inventive device allows fine adjustment of the printing pattern within one printing head without any mechanical means. Thereby, a particularly high printing quality is achieved by reducing the error between the expected and the real printing dot position for every printed dot. To create a visible printing dot, the printing head might have to send several ink drops in a row, but for the sake of this description, we will consider the multiplicity of ink drops sent in a row as a single one.

In particular, the control unit is programmed with a respective software in order to determine an appropriate delay value for an individual nozzle based on the deviation of a printed dot from the position of the corresponding nozzle.

The printing device is configured for carrying out the method described above.

According to one aspect, the control unit is further configured for determining a deviation of the position and/or orientation of the printing heads from a target position, and the printing device comprises an adjustment unit configured to adjust a position and/or orientation of the at least one printing head based on a deviation determined by the control unit. Thereby, the adjustment of the at least one printing head may occur in a simple and precise manner.

The pixel size of the camera may be bigger than a required measurement accuracy for the printing head position. For example, a typical requirement is an accuracy of 50 μm. Thus, the pixel size may be bigger than 50 μm. This is made possible by the multiplicity of measurement points which give the printing head position measurement a higher accuracy than the individual measurement accuracy of each printed dot. In other words, we can afford having a pixel size larger than 50 μm for a positioning accuracy specification of (less than) 50 μm.

The pixel size of the camera of less than half of the distance of two adjacent nozzles ensures that the camera may capture and distinguish every dot printed by the printing head such that the adjustment of the printing heads is facilitated in a simple and precise manner.

For example, the pixel size of the camera is 0.4 times the distance between two adjacent nozzles of a printing head, or less. When the pixel size is at least slightly less than half of the distance of two adjacent nozzles, the camera is able to distinguish the dots printed by a printing head even if the position of the dots deviates from an ideal position. This may happen, for example, if single drops out of the nozzles of the printing head are delayed while the paper/substrate travels along the advance direction.

Please note that the distance between two adjacent nozzles is much larger than the distance between two adjacent printed pixels in an image, thanks to the print head geometry and an accurate ink dispensing timing. In our example, the distance between two adjacent nozzles is around 300 μm, while the distance between two printed pixels in a printed image, i.e. the print resolution distance, is 21 μm. These 21 μm are made possible by the two-dimensional nature of the nozzle distribution and by carefully using the timing of the generation of the ink drops that can project the dots on a single dimension on paper. Thus, we can afford using a camera with a pixel size which is larger than half the print resolution distance (e.g. 10 μm). In practice, we may use a camera pixel size which is larger than the print resolution distance, even larger than twice, three times, or even four to five times the print resolution distance.

Preferably, the camera has a double function and also works as a quality control camera for controlling the quality of a printed image in normal production operation. This is particularly advantageous regarding the compact and cost-efficient construction of the printing device.

According to one aspect, the printing device comprises at least two printing heads and the control unit is configured to control a timing of a dispensation of ink drops from the different printing heads. In other words, a global delay may be achieved for the dispensation of ink drops from all nozzles of a printing head, i.e. the dispensation of ink drops is delayed with the same value at every nozzle of one printing head.

The delay depends on a printing speed, in particular the paper/substrate travel speed, for the individual delay as well as for the global delay.

For example, the position of the at least one printing head is adjustable in a direction transverse to an advance direction of the printing device and the position of the printing head is rigidly fixed with respect to the advance direction. This simplifies the setup of the printing device and makes the position of the printing head more stable.

In order to enable a rotational adjustment of the at least one printing head, the printing head may be mounted rotatably. A rotational adjustability, in particular in combination with an adjustability in a direction transverse to an advance direction of the printing device, allows a very flexible positioning of the at least one printing head.

The at least one printing head may have nozzles arranged in columns and rows, wherein each column and row has at least two nozzles. In particular, each column and row comprises a plurality of nozzles. Thereby, a particularly high resolution of an image printed by the printing device is achieved.

For example, the columns and rows are arranged in form of a parallelogram. For example, the nozzles are displaced with respect to each other such that the dots printed by one printing head can be positioned closer to each other than the mechanical distance between the nozzles, which contributes to a high resolution of the printed image.

In particular, the distance between two adjacent nozzles of the printing head is significantly larger than the distance with which two adjacent printed dots can be printed on paper/substrate. This is made possible by the two-dimensional aspect of the printing head, which can, for example, produce a single line of dots on paper/substrate by adjusting the timing of the dispense of ink drops accordingly.

Preferably, the camera is a linear scan camera covering the whole width of the at least one printing head (preferably the width of two printing heads). Thus the camera does not need to travel back and forth on a rail to perform the calibration of the printing head, which reduces the calibration time, and thus the paper waste. The same result can be achieved using a combination of cameras aligned to cover the whole width of the printing head.

The camera is preferably positioned downstream of the at least one printing head with respect to paper/substrate travel direction.

The at least one printing head is for example attached to a bar extending transverse to an advance direction of the printing device. This enables a stable suspension of the printing head.

For example, the bar is attached to a machine frame.

Figure 2:
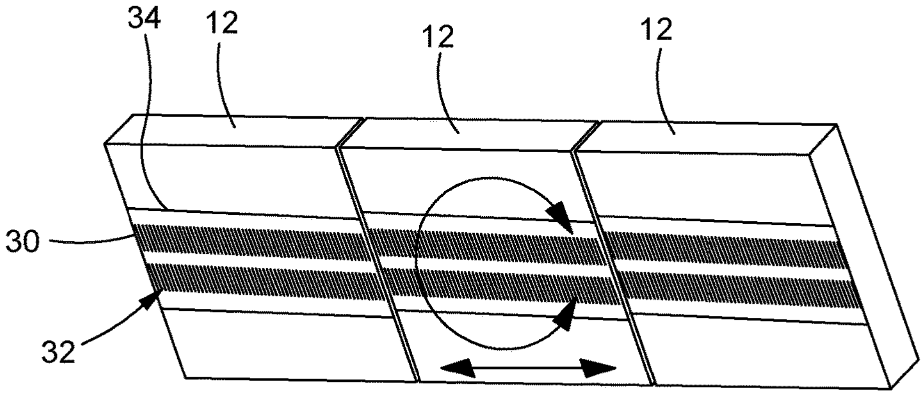
Figure 3:
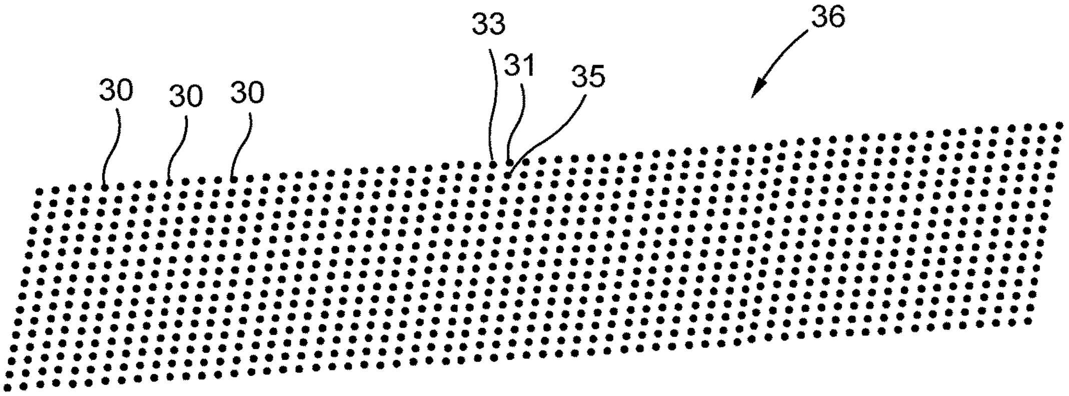
Figure 4:
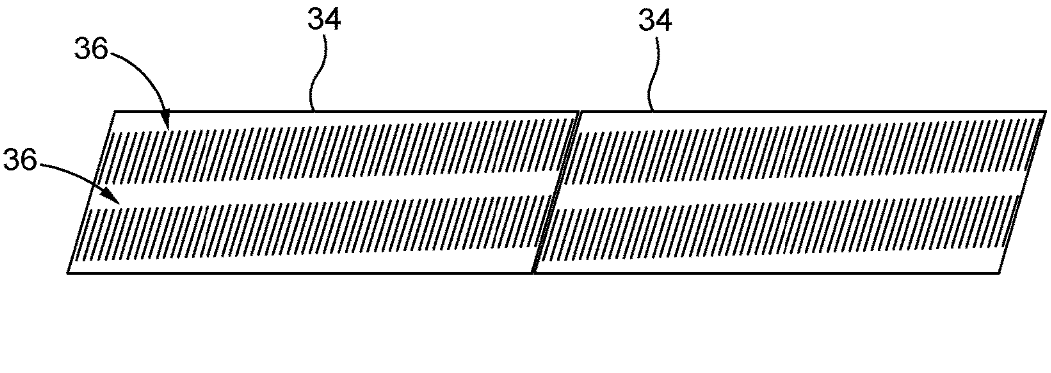
Figure 5:
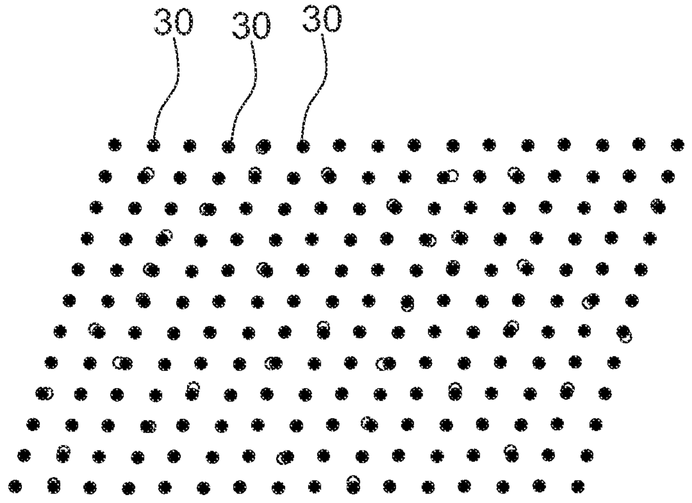

Further features and advantages of the invention become apparent from the following description and the enclosed figures. In the figures:

FIG. 1 shows an inventive printing device in a schematic view seen from below, FIG. 2 shows printing heads of the inventive printing device of FIG. 1, FIG. 3 shows a representation of a nozzle pattern of one of the printing heads of FIG. 2 seen from inside the printing head, FIG. 4 schematically shows panels of two printing heads seen from inside the printing head, and FIG. 5 shows a pattern visualizing the dots printed by a printing head compared to a nozzle pattern.

FIG. 1 shows a printing device 10 comprising a plurality of printing heads 12 in a schematic view. In the depicted embodiment, seven printing heads 12 are shown, however, the number of printing heads 12 may vary.

The printing device 10 is an ink jet printing device, in particular a digital printer.

The printing device 10 has a resolution of 30 μm or an even better resolution. The resolution means the minimal distance between two printed dots.

The printing heads 12 are attached to a bar 14 extending transverse to an advance direction of the printing device 10.

The bar 14 is attached to a machine frame 16 of the printing device 10.

The advance direction corresponds to a paper/substrate travel direction and is indicated in FIG. 1 by arrow 18.

All the printing heads 12 attached to one bar 14 are configured to print a single colour. Thus, for printing different colours the printing device 10 comprises several printing bars 14 with attached printing heads 12 that are arranged along the advance direction. For reasons of simplicity, only one printing bar 14 is depicted in FIG. 1.

The printing device comprises a camera 20, which is for example a 2D-camera, in particular a linear camera, that is configured to capture an image printed by the printing heads 12.

The camera 20 covers the whole width of the printing heads 12. In particular, the camera 20 extends over the whole width of a paper/substrate 22 that is processed in the printing device 10.

The camera is positioned downstream of the printing heads 12 with respect to the paper/substrate travel direction 18.

The printing device 10 further comprises a control unit 24 configured for processing the image captured by the camera 20.

The control unit 24 is further configured for determining a deviation of the position and/or orientation of the printing heads 12 from a target position.

The target position is a position in which the printing heads 12 attached to one bar 14 are aligned with respect to each other in such a way that an image printed by the printing device 10 is printed with the required accuracy i.e. such that no transition zone between two printing heads 12 is visible on the printed image.

In order to align the printing heads 12 with respect to each other, the printing device comprises an alignment unit 26.

The alignment unit 26 is configured to adjust a position and/or orientation of the printing heads 12 based on a deviation determined by the control unit 24.

The position of the printing heads 12 is adjustable in a direction transverse to the advance direction 18 of the printing device 10, in particular by means of the alignment unit 26.

Furthermore, the printing heads 12 are mounted rotatably.

The position of the printing heads 12 with respect to the advance direction 18 is fixed.

For example, the alignment unit 26 comprises alignment means 28 assigned to each printing head 12.

The alignment means 28 may comprise a linear drive and/or a rotational drive in order to adjust the position and/or orientation of the printing heads 12.

The printing heads 12 are two-dimensional printing heads.

FIG. 2 shows three printing heads 12 arranged in a row in a view from below such that the nozzles 30 of the printing heads 12 are visible.

Each of the printing heads 12 comprises a plurality of nozzles 30 (see also FIGS. 3 and 4).

More precisely, each printing head 12 comprises a printing section 32 in which the nozzles 30 are arranged.

Each nozzle 30 can be addressed individually.

Also, the amount of ink ejected from a nozzle 30 can be controlled individually.

The nozzles 30 are produced in a panel 34 which is inserted in the printing head 12.

In order to print an image, drops of ink are dispensed from the nozzles 30 in order to form dots on a paper/substrate 22 while the paper/substrate 22 travels along the advance direction.

The control unit 24 is configured to control the timing when a drop is dispensed from a nozzle 30. In particular, the control unit 24 is configured to delay a dispensation of ink drops from a nozzle.

According to one aspect, a global delay can be achieved by means of the control unit 24. That means that the control unit 24 adapts the timing for dispensation of ink from all nozzles 30 of a printing head 12 in the same manner.

According to another aspect an individual delay can be achieved, which means that the timing for dispensation of ink from the nozzles is controlled individually for every single nozzle 30 of a printing head 12.

FIG. 3 shows a nozzle pattern 36 of a printing head 12. The pattern 36 depicted in FIG. 3 may be present twice on each printing head 12, as it is apparent in FIG. 2.

The position of the nozzles 30 in the printing head 12 can be manufactured with a high accuracy, in particular with an accuracy in the submicron range. For example, the position of the nozzles 30 is produced with an accuracy of 80 to 100 nm.

The nozzles 30 are arranged in columns and rows, wherein each column and row has a plurality of nozzles 30.

More precisely, the columns and rows are arranged in form of a parallelogram.

The specific pattern of the nozzles 30 facilitates a high resolution of an image printed by the printing device.

In one exemplary embodiment, the printer can print a dot every 21.16 μm while a diameter of the printed dot is 30 μm.

FIG. 4 schematically shows the panels 34 of two printing heads 12 comprising the nozzle pattern 36 of FIG. 3.

However, the nozzle pattern 36 of FIG. 3 is comprised twice by each printing head 12, wherein there is a distance between the patterns 36.

The parallelograms formed by the columns and rows of nozzles 30 are tilted with respect to the outer boundaries of the printing heads 12.

More precisely, a row formed by the outermost nozzles 30 of the nozzle pattern 36 is inclined with respect to an edge of the printing head 12 extending in a direction transverse to the advance direction 18. This tilted arrangement ensures a continuous printing dot coverage capability in a direction transverse to an advance direction of the printing device 10 despite a small (adjustable) gap between the printing heads 12. In other words, the leftmost nozzle in a printing head is located to the left of the rightmost nozzle of its (closest) neighbouring printing head when there is no gap between the printing heads, the right and left direction being measured along direction transverse to an advance direction 18 of the printing device 10. Thanks to the inclination of the outermost nozzles 30 of the nozzle pattern 36, the largest acceptable gap between the printing heads 12 that keeps a continuous printing dot coverage is increased. In particular, due to the tilted arrangement, two neighbouring printing heads 12 can print with a slight overlap to avoid a visible gap in the printed image even if there is a slight distance between the printing heads 12.

The pixel size of the camera 20 is related to the nozzle pattern 36, in particular to a distance of the nozzles 30.

The pixel size of the camera 20 is less than half of the distance between two adjacent nozzles 30 of a printing head 12, for example 0.4 times the distance between two adjacent nozzles 30. Thus, the camera 20 comprises at least two pixels for one dot printed by a printing head 12.

Yet, the pixel size of the camera 20 is bigger than a required measurement accuracy, in particular bigger than 50 μm.

In an exemplary embodiment, the pixel size is 90 μm.

FIG. 5 shows a printing pattern printed by a printing head 12 compared to a nozzle pattern 36.

The filled dots visualize the position of the nozzles 30. The unfilled dots visualize the position of the dots printed by the printing head 12.

In an ideal scenario, when every ink drop lands exactly at the desired position on the paper/substrate 22, the arrangement of the printed dots corresponds to the nozzle pattern 36.

In FIG. 5, however, it is obvious that the arrangement of the dots does not completely correspond to the nozzle pattern 36. This deviation is due to different random factors, like for example, small differences in reaction time of each individual nozzle, small differences in ejection pressure and speed or differences in the angle of ejection of the ink drops.

Such a deviation can be compensated along the advance direction 18 of the printing device 10 by means of the control unit 24 controlling the timing of a dispensation of ink drops from every nozzle of a printing head individually.

The compensation becomes effective for images printed after the compensation happened.

In the following, a method for aligning the printing heads 12 of a printing device is described. In practice, the fine adjustment of the position of ink drops method disclosed in this invention is applied after the print heads 12 are aligned An alignment of the printing heads 12 is necessary before the first use of the printing device 10 or after a printing head 12 has been exchanged or reinstalled, for example after maintenance. When all printing heads 12 are properly aligned, a high-quality print can be achieved.

Firstly, the printing device 10 is started and a paper/substrate 22 travels along the advance direction 18.

While the paper/substrate 22 travels along the advance direction 18, an ink drop is dispensed at a plurality of nozzles 30 of every printing head 12 simultaneously to print an image, preferably at all nozzles 30 of every printing head 12.

However, it is also possible that ink is dispensed only at a determined group of nozzles 30. For example, ink may be dispensed from every nozzle 30 except the outermost nozzles 30 of the nozzle pattern 36. In another example, the ink may be dispensed from every third (or n-th) nozzle 30 of the nozzle pattern 36 (in both directions).

By dispensing an ink drop from each nozzle 30 simultaneously, the printed dots allow conclusions about the positions of the printing heads 12 with respect to each other. The simultaneous dispensation is only necessary for a calibration process, in the regular operation of the printing device, a simultaneous dispense is not required.

While the paper/substrate 22 travels further along the advance direction 18, the printed image is captured by a camera 20.

Because of the specific pixel size already discussed above, the camera 20 can distinguish all the dots printed by the printing heads 12.

For each dot of the image that is captured by the camera 20, it is estimated by the control unit 24 from which nozzle 30 the ink producing the dot has most likely been ejected.

Based on the image captured by the camera 20, the position and/or orientation of each of the printing heads 12 is determined.

The position and/or orientation of the printing head 12 is for example estimated by means of bundle adjustment. For example, an iteratively reweighted square method can be used.

Optionally, a scale parameter could be added in the estimation.

Optionally, a skew parameter could be added in the estimation. En réalité: 2 translation, 2 scales, 1 skew et 1 rotation, rajouter cela dans l'autre brevet?

Afterwards, the deviation of the position and/or orientation of each printing head 12 from a target position and/or orientation is determined, in particular by means of the control unit 24.

For example, information about a target position of the printing heads 12 is saved in a memory of the control unit 24.

If a deviation has been detected, the position and/or the orientation of the printing heads 12 is adjusted, in particular by means of the adjustment unit 26.

When a deviation has been detected regarding a position of a printing head 12 in a direction traverse to an advance direction 18 of the printing device 10, the position of the printing heads 12 is adjusted mechanically in the respective direction.

If a deviation has been detected regarding a rotational orientation of a printing head 12, the orientation is adjusted mechanically.

The position of the printing heads 12 can be adjusted with an accuracy of at least 5 μm.

However, if a deviation has been detected regarding a position of a printing head 12 in the advance direction 18 with respect to the neighbouring printing heads, the misalignment is compensated by means of the control unit 24 determining a delay parameter for the respective printing head 12. In particular, the control unit 24 effects a global delay.

Moreover, in order to compensate for the misalignment of individual dots of an image with respect to the nozzles 30 of the printing head 12, the dispensation of an ink drop from a respective nozzle 30 is modified in terms of timing with respect to the dispense of ink drops from the other nozzles 30 of the printing head 12 for the subsequent printing process.

The dispensation timing of each individual nozzle 30 is controlled by the control unit 24.

The invention claimed is:

1. A method for fine adjustment of a position of ink drops printed by a printing head of a printing device, the printing head being a two-dimensional printing head comprising a plurality of nozzles arranged in columns and rows, wherein each column and row has at least two nozzles of the plurality of nozzles, the method comprising:

dispensing an ink drop at each of the plurality of nozzles of the printing head simultaneously to print an image, wherein the image is a pattern of dots that reproduces a two-dimensional geometric pattern of the plurality of nozzles on a substrate, capturing the image by a camera, wherein the camera captures the pattern of dots and the captured pattern is compared to a pattern of the plurality of nozzles, and modifying the dispensation of an ink drop from one nozzle of the plurality of nozzles in terms of timing with respect to the dispense of ink drops from all nozzles other than the one nozzle, of the plurality of nozzles for a subsequent printing process if a deviation has been detected between the pattern of dots and the pattern of the plurality of nozzles.

2. The method according to claim 1, further comprising:

determining a position and/or an orientation of the printing head based on the image captured by the camera, determining a deviation of the position and/or orientation of the printing head from a target position and/or a target orientation, and adjusting the position and/or the orientation of the printing head based on the determined deviation.

3. The method according to claim 2, further comprising:

adjusting the position of the printing head mechanically in a direction traverse to an advance direction of the printing device.

4. The method according to claim 1, wherein the printing device comprises at least two printing heads, including the printing head, and a delay parameter is determined for the printing head in order to compensate a misalignment of the printing head along an advance direction of the printing device.

5. The method according to claim 1, wherein the camera covers an entire width of the printing head.

6. The printing device according to claim 1, wherein modifying the dispensation of the ink drop from the at least one nozzle is modifying the dispensation of the ink drop from the at least one nozzle relative to another nozzle of the plurality of nozzles.

7. A printing device, in particular an ink jet printing device, comprising:

a printing head being a two-dimensional printing head comprising a plurality of nozzles arranged in columns and rows, wherein each column and row has at least two nozzles of the plurality of nozzles, a camera configured to capture an image printed by the printing head, a control unit configured for processing the image captured by the camera and for comparing a pattern of printed dots of the image to a pattern of the plurality of nozzles and detecting a deviation between the pattern of printed dots and the pattern of the plurality of nozzles, and wherein the pattern of printed dots is generated by simultaneously dispensing ink at each of the plurality nozzles and represents a geometric pattern of the plurality of nozzles, wherein the control unit is configured for controlling a timing of a dispensation of ink drops from each nozzle of the plurality of nozzles individually if a deviation has been detected between the pattern of dots and the pattern of the plurality of nozzles.

8. The printing device according to claim 7, wherein the control unit is configured for determining a deviation of a position and/or an orientation of the printing head from a target position, and wherein the printing device comprises an adjustment unit configured to adjust the position and/or the orientation of the printing head based on the deviation determined by the control unit.

9. The printing device according to claim 8, wherein the printing head is mounted rotatably.

10. The printing device according to claim 7, wherein a pixel size of the camera is less than half of a distance between two adjacent nozzles of the plurality of nozzles and bigger than a required measurement accuracy of 50 μm.

11. The printing device according to claim 7, wherein the printing head includes at least two printing heads, wherein the control unit is configured to control a timing of a dispensation of ink drops from both of the at least two printing heads.

12. The printing device according to claim 7, wherein a position of the printing head is adjustable in a direction transverse to an advance direction of the printing device and the position of the printing head is fixed with respect to the advance direction.

13. The printing device according to claim 7, wherein the columns and rows are arranged in the shape of a parallelogram.

14. The printing device according to claim 7, wherein the camera is a linear camera covering an entire width of the printing head.

15. The printing device according to claim 7, wherein the printing head is attached to a bar extending transverse to an advance direction of the printing device.

* * * * *